(12) United States Patent
Newton

(10) Patent No.: US 11,614,112 B2
(45) Date of Patent: Mar. 28, 2023

(54) TEMPORARY CLAMPING FASTENER WITH EXPANDABLE CLAMP BLADE

(71) Applicant: The Boeing Company, Chicago, IL (US)

(72) Inventor: Andrew Perry Newton, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 343 days.

(21) Appl. No.: 16/720,319

(22) Filed: Dec. 19, 2019

(65) Prior Publication Data
US 2021/0190108 A1    Jun. 24, 2021

(51) Int. Cl.
*F16B 13/04*       (2006.01)
*F16B 5/06*        (2006.01)
*F16B 19/10*       (2006.01)
*F16B 13/08*       (2006.01)

(52) U.S. Cl.
CPC .......... *F16B 5/0642* (2013.01); *F16B 19/109* (2013.01); *F16B 13/0808* (2013.01)

(58) Field of Classification Search
CPC ........................... F16B 19/109; F16B 13/0808
USPC .......................... 411/551, 344, 345, 15, 80.1
See application file for complete search history.

(56) References Cited

U.S. PATENT DOCUMENTS

| | | | | |
|---|---|---|---|---|
| 939,921 A * | 11/1909 | Moeller | ................ | B25B 31/005 411/345 |
| 1,169,635 A * | 1/1916 | Grimes | ............... | F16B 13/0808 411/21 |
| 2,164,447 A * | 7/1939 | Clarke | .................. | F16B 19/109 24/609 |
| 2,318,548 A * | 5/1943 | Whitehead | ............ | B25B 31/005 411/345 |
| 2,408,560 A * | 10/1946 | Keehn | ................... | B25B 31/005 269/232 |
| 3,248,994 A * | 5/1966 | Mortensen | .......... | F16B 13/0808 411/344 |
| 3,872,768 A * | 3/1975 | Ernst | .................... | F16B 13/0808 411/345 |
| 4,671,718 A * | 6/1987 | Eakin | ....................... | B21J 15/42 24/606 |
| 5,803,688 A * | 9/1998 | Gleason | .............. | F16B 13/0808 411/344 |
| 6,193,261 B1 * | 2/2001 | Hahka | ...................... | B60D 1/02 24/453 |
| 6,752,562 B2 * | 6/2004 | Mills | ..................... | F16B 19/109 403/321 |
| 9,115,744 B1 * | 8/2015 | Bulow | ................ | F16B 19/1036 |

(Continued)

*Primary Examiner* — Gary W Estremsky
(74) *Attorney, Agent, or Firm* — Vivacqua Crane, PLLC

(57) ABSTRACT

A temporary clamping fastener is disclosed, and includes a bushing having an inner cavity, an upper open end, and a lower open end. The temporary clamping fastener also includes a pull shaft having an elongated body and a slot extending through the elongated body. A portion of the pull shaft is disposed in the inner cavity of the bushing, and the pull shaft is configured to linearly translate relative to the bushing. The temporary clamping fastener also includes a clamp blade disposed within the slot of the pull shaft and rotatable between a stowed position where the clamp blade is housed within the slot and a deployed position and a portion of the clamp blade extends from the slot of the pull shaft to create an engagement surface for through-hole clamping.

20 Claims, 9 Drawing Sheets

(56) References Cited

U.S. PATENT DOCUMENTS

| | | | | |
|---|---|---|---|---|
| 9,200,659 B1* | 12/2015 | LaFurge, Jr. | ........... | F16B 19/109 |
| 10,267,349 B2* | 4/2019 | Apostolopoulos | ...... | F16B 37/12 |
| 10,472,845 B2* | 11/2019 | Stevens | ................... | E04H 12/20 |
| 10,890,204 B1* | 1/2021 | Vela | ........................ | F16B 21/12 |
| 2004/0047710 A1* | 3/2004 | Lauchner | .............. | F16B 37/043 |
| | | | | 411/340 |
| 2008/0003077 A1* | 1/2008 | Anderson | ............. | F16B 19/109 |
| | | | | 411/347 |
| 2018/0051736 A1* | 2/2018 | Siegmund | ............. | F16B 19/109 |

\* cited by examiner

TEMPORARY CLAMPING FASTENER WITH EXPANDABLE CLAMP BLADE

INTRODUCTION

The present disclosure relates to temporary clamping fasteners. More particularly, the present disclosure is directed towards a temporary clamping fastener having an expandable clamp blade.

BACKGROUND

Sometimes it is necessary to temporarily clamp a multi-layer assembly together using fasteners. For example, temporary fasteners are often used in the aerospace industry to temporarily attach sheets forming the skin of an aircraft to one another.

One type of temporary fastener is a clamping fastener, which is sometimes referred to as a cleko fastener. The clamping fastener includes two laterally spreadable clamping pins as well as a spacer pin that is placed between the two clamping pins. The clamping pins include respective distal ends that are separated from one another by the spacer pin. The clamping fastener also includes a plunger. When an operator depresses the plunger, the clamping pins laterally spread apart and extend past a distal end of the spacer pin. Once the clamping pins extend beyond the spacer pin, then the distal ends of the two clamping pins laterally retract towards one another. The clamping pins may then be inserted into an aperture. The operator may then release the plunger. This results in the clamping pins to retract vertically, and the respective distal ends of the clamping pins are separated from one another by the spacer pin again. As the distal ends of the clamping pins separate from one another, they engage and lock against opposing surfaces of the aperture.

Although clamping fasteners are effective at temporarily securing multi-layer assemblies together, some drawbacks may exist. For example, clamping fasteners are only accessible from a single side of a multi-layer assembly. Furthermore, there is only a limited amount of expansion that occurs when the clamping pins are separated from one another by the spacing pin. As a result, sometimes an extra fastener is required to secure multiple layers in place. For example, a front layer may include a primary pilot hole and a backside layer may include a backside pilot hole, where the backside pilot hole is larger in diameter or is eccentric with respect the primary pilot hole. In this instance, a backup load bearing washer may be required. Specifically, the load bearing washer would be installed around the backside pilot hole. Furthermore, since the clamping fastener is only accessible from the front layer of the multi-layer assembly, an extra operator is required to install the load bearing washer around the backside pilot hole.

SUMMARY

According to several aspects, a temporary clamping fastener is disclosed, and includes a bushing having an inner cavity, an upper open end, and a lower open end. The temporary clamping fastener also includes a pull shaft having an elongated body and a slot extending through the elongated body. A portion of the pull shaft is disposed in the inner cavity of the bushing, and the pull shaft is configured to linearly translate relative to the bushing. The temporary clamping fastener also includes a clamp blade disposed within the slot of the pull shaft and rotatable between a stowed position where the clamp blade is housed within the slot and a deployed position and a portion of the clamp blade extends from the slot of the pull shaft to create an engagement surface for through-hole clamping. The clamp blade rotates from the stowed position into the deployed position as the pull shaft translates in a direction towards the upper open end of the bushing.

In another aspect, a temporary clamping fastener is disclosed and includes a bushing defining an inner cavity, an upper open end, and a lower open end. The temporary clamping fastener also includes a nut positioned in the upper open end of the bushing and rotatable relative to the bushing, where the nut defines a threaded aperture. The temporary clamping fastener also includes a pull shaft defining an elongated body, an upper end portion, and a slot extending through the elongated body of the pull shaft. The upper end portion of the pull shaft is threadingly engaged with the threaded aperture of the nut, and a portion of the pull shaft is disposed with the inner cavity of the bushing and is configured to linearly translate relative to the bushing as the nut is rotated relative to the bushing. The temporary clamping fastener also includes a clamp blade disposed within the slot of the pull shaft and rotatable between a stowed position where the clamp blade is housed within the slot and a deployed position where a portion of the clamp blade extends out of the slot of the pull shaft to create an engagement surface for through-hole clamping. The clamp blade rotates from the stowed position into the deployed position as the pull shaft translates in a direction towards the upper open end of the bushing.

In still another embodiment, a method of installing a temporary clamping fastener to a through-hole that is part of a multi-layer assembly is disclosed. The method includes rotating a nut having a threaded aperture that is positioned at an upper open end of a bushing. The bushing is disposed within a primary pilot hole of the multi-layer assembly. The method also includes translating a pull shaft in a linear direction towards the upper open end of the bushing. An upper end portion of an elongated body of the pull shaft is engaged with the threaded aperture of the nut, and rotating the nut causes the pull shaft to translate in the linear direction. The method further includes rotating a clamp blade disposed within a slot of the pull shaft from a stowed position where the clamp blade is housed within the slot into a deployed position. The clamp blade is rotated to the deployed position as the pull shaft translates in a direction towards the upper open end of the bushing. The method also includes extending the clamp blade out of the slot of the pull shaft to create an engagement surface for providing through-hole clamping of the multi-layer assembly.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a temporary clamping fastener having an extendable clamp blade. Specifically, the temporary clamping fastener includes an extendable clamp blade that rotates between a stowed position and a deployed position. The clamp blade also includes a pull shaft and a bushing, where a portion of the pull shaft is disposed in an inner cavity of the bushing, and the pull shaft is configured to linearly translate relative to the bushing. The clamp blade is disposed within a slot of the pull shaft and is rotatable between the stowed position where the clamp blade is housed within the slot and a deployed position where a portion of the clamp blade extends from the slot of the pull shaft to create an engagement surface for through-hole clamping. The clamp blade rotates from the stowed position into the deployed position as the pull shaft translates in a direction towards the upper open end of the bushing.

The following description is merely exemplary in nature and is not intended to limit the present disclosure, application, or uses.

Figure 1:
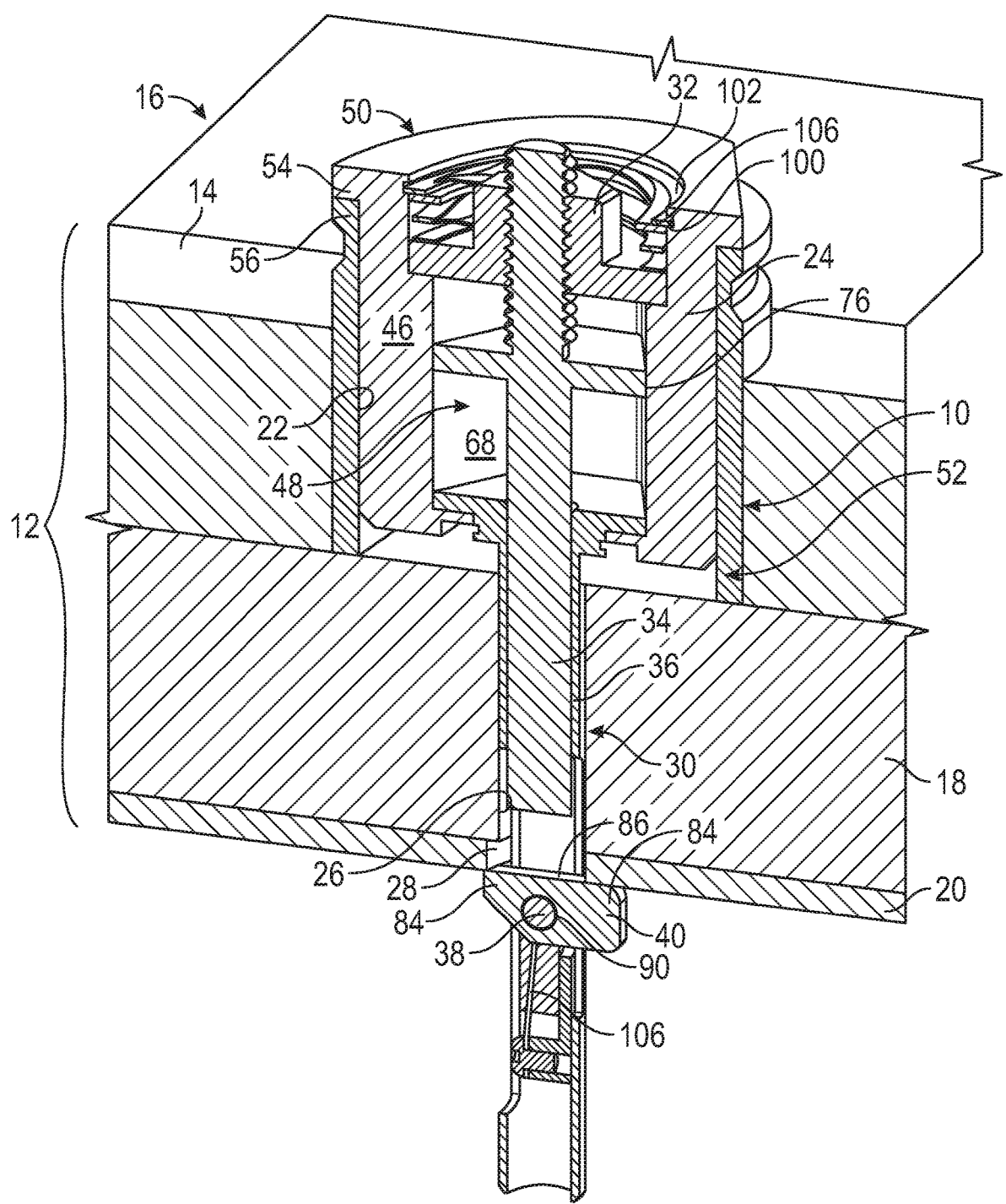
FIG. 1 is a cross-sectioned view of the disclosed temporary clamping fastener for securing a multi-layer assembly together, where the temporary clamping fastener includes a clamp blade that is in a deployed position, according to an exemplary embodiment.

Referring to FIG. 1, a cross-sectioned view of an exemplary temporary clamping fastener 10 is illustrated. The temporary clamping fastener 10 clamps a multi-layered assembly 12 together. In the non-limiting embodiment as shown, the multi-layered assembly 12 includes a drill jig 14 that is disposed on an uppermost side 16 of the multi-layered assembly 12, a carbon fiber layer 18, and a metal layer 20. The drill jig 14 includes a primary pilot hole 22 shaped to receive a bushing 24 of the temporary clamping fastener 10. The carbon fiber layer 18 defines a backside pilot aperture 26, and the metal layer 20 defines a drilled aperture 28. The primary pilot hole 22 is axially aligned with the apertures 26, 28 in the carbon fiber layer 18 and the metal layer 20 to form a through-hole 30. The temporary clamping fastener 10 includes the bushing 24, a nut 32, a pull shaft 34, a guide member 36, and a clamp blade 40. The clamp blade 40 rotates about a dowel pin 38 between a deployed position (seen in FIG. 1) and a stowed position (seen in FIG. 2). The temporary clamping fastener 10 is configured to temporarily clamp the multi-layered assembly 12 together when the clamp blade 40 is in the deployed position.

Figure 3:
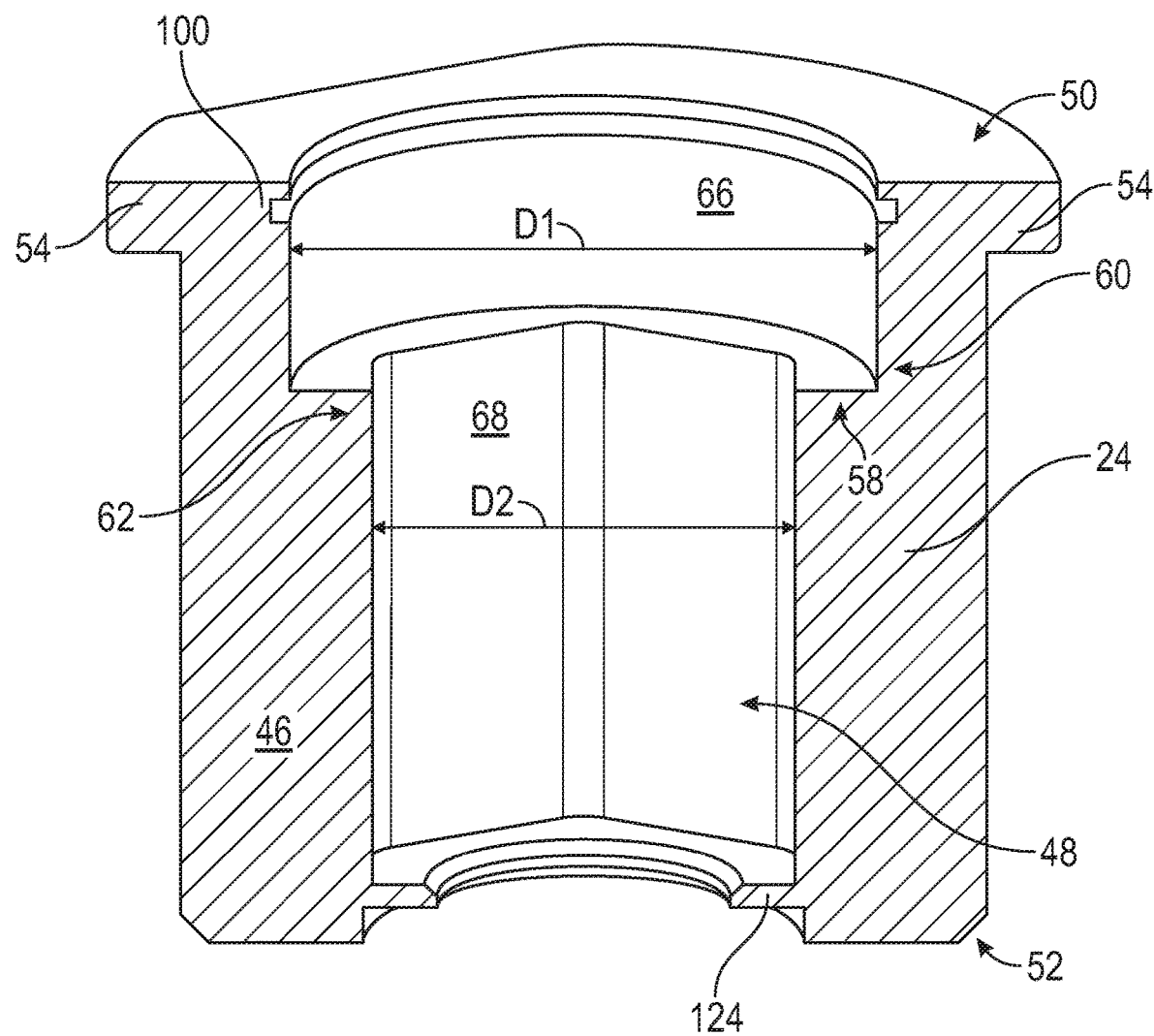
FIG. 3 is a cross-sectioned view of a bushing that is part of the temporary clamping fastener, according to an exemplary embodiment.

The bushing 24 includes an annular housing 46 having an inner cavity 48, an upper open end 50, and a lower open end 52. A shoulder 54 is disposed around the upper open end 50 of the housing 46. The shoulder 54 of the housing 46 abuts against a raised wall 56 that surrounds the primary pilot hole 22 of the drill jig 14, where the abutment between the shoulder 54 of the housing 46 and the raised wall 56 of the drill jig 14 retains the bushing 24 within the drill jig 14. FIG. 3 is a cross-sectioned view of the housing 46 of the bushing 24. In the exemplary embodiment as shown, the inner cavity 48 of the housing 46 includes a step 58 that separates a first opening 60 from a second opening 62, where the first opening 60 includes a first diameter D1 that is greater than a second diameter D2 of the second opening 62. The first opening 60 is located directly adjacent to the upper open end 50 of the inner cavity 48 of the bushing 24 and includes a rounded or annular surface 66, and the second opening 62 of the inner cavity 48 the inner cavity 48 of the bushing 24 defines a keyed surface 68. As explained below, the keyed surface 68 of the bushing 24 prevents rotation of the pull shaft 34 (FIG. 1).

Figure 4:
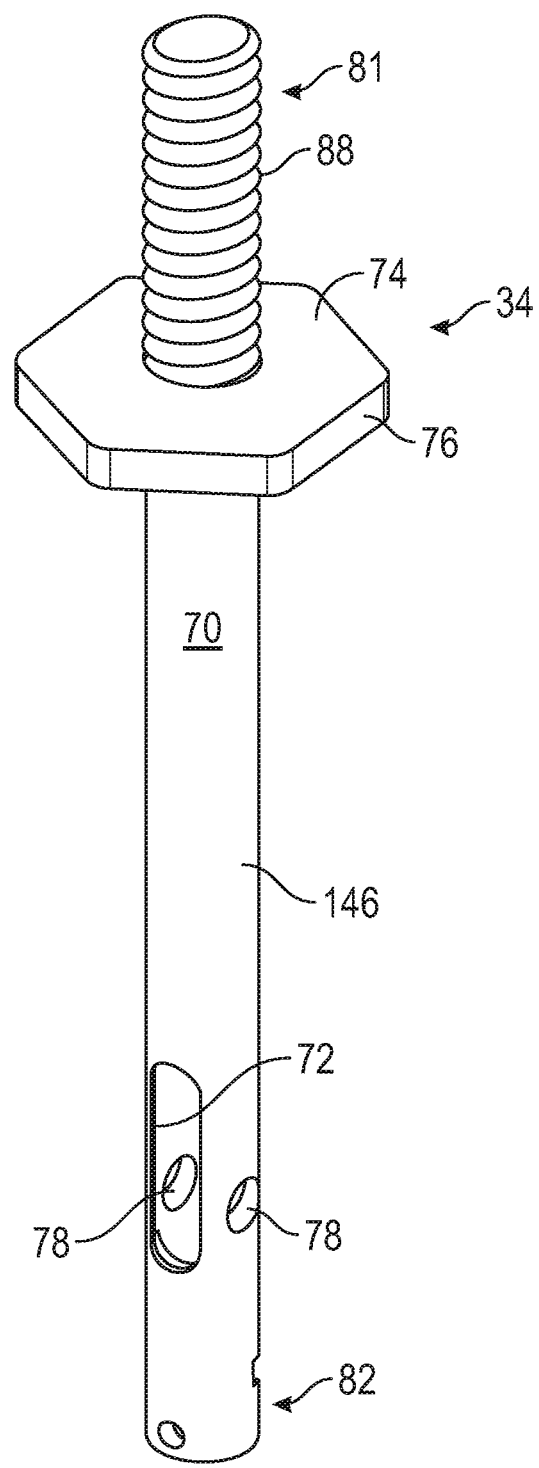
FIG. 4 is a perspective view of a pull shaft that is part of the temporary clamping fastener, according to an exemplary embodiment.

FIG. 4 is a perspective view of the pull shaft 34, where the pull shaft 34 includes an elongated body 70, a slot 72 extending through the elongated body 70, and a boss 74. The boss 74 of the pull shaft 34 projects radially outward from the elongated body 70 of the pull shaft 34. Referring to FIGS. 1, 3, and 4, the boss 74 of the pull shaft 34 defines a radial surface 76 that is complimentary to the keyed surface 68 of the inner cavity 48 of the bushing 24. Accordingly, the radial surface 76 of the boss 74 engages with the keyed surface 68 of the inner cavity 48 of the bushing 24. The engagement between the radial surface 76 of the boss 74 and the keyed surface 68 of the inner cavity 48 of the bushing 24 prevents relative rotation between the pull shaft 34 and the bushing 24. FIG. 3 illustrates the keyed surface 68 of the inner cavity 48 of the bushing 24 includes a hexagonal profile. However, it is to be appreciated that the profile shown in FIG. 3 is merely exemplary in nature, and that other profiles may be used instead. For example, in another embodiment the keyed surface 68 of the inner cavity 48 of the bushing 24 includes an octagonal profile.

Referring to both FIGS. 1 and 4, the clamp blade 40 is disposed within the slot 72 of the pull shaft 34, and the dowel pin 38 is received by a pair of opposing apertures 78 formed in the elongated body 70 of the pull shaft 34. The dowel pin 38 is further received by an aperture 90 formed in the clamp blade 40. Accordingly, the clamp blade 40 is rotatable about the dowel pin 38 between the stowed position (seen in FIG. 2). The clamp blade 40 is housed within the slot 72 of the pull shaft 34, and the deployed position, where a portion 84 of the clamp blade 40 extends from the slot 72 of the pull shaft 34 to create an engagement surface 86 for through-hole clamping. The temporary clamping fastener 10 clamps the multi-layer assembly 12 by engaging the through-hole 30 (seen in FIG. 1).

Figure 5:
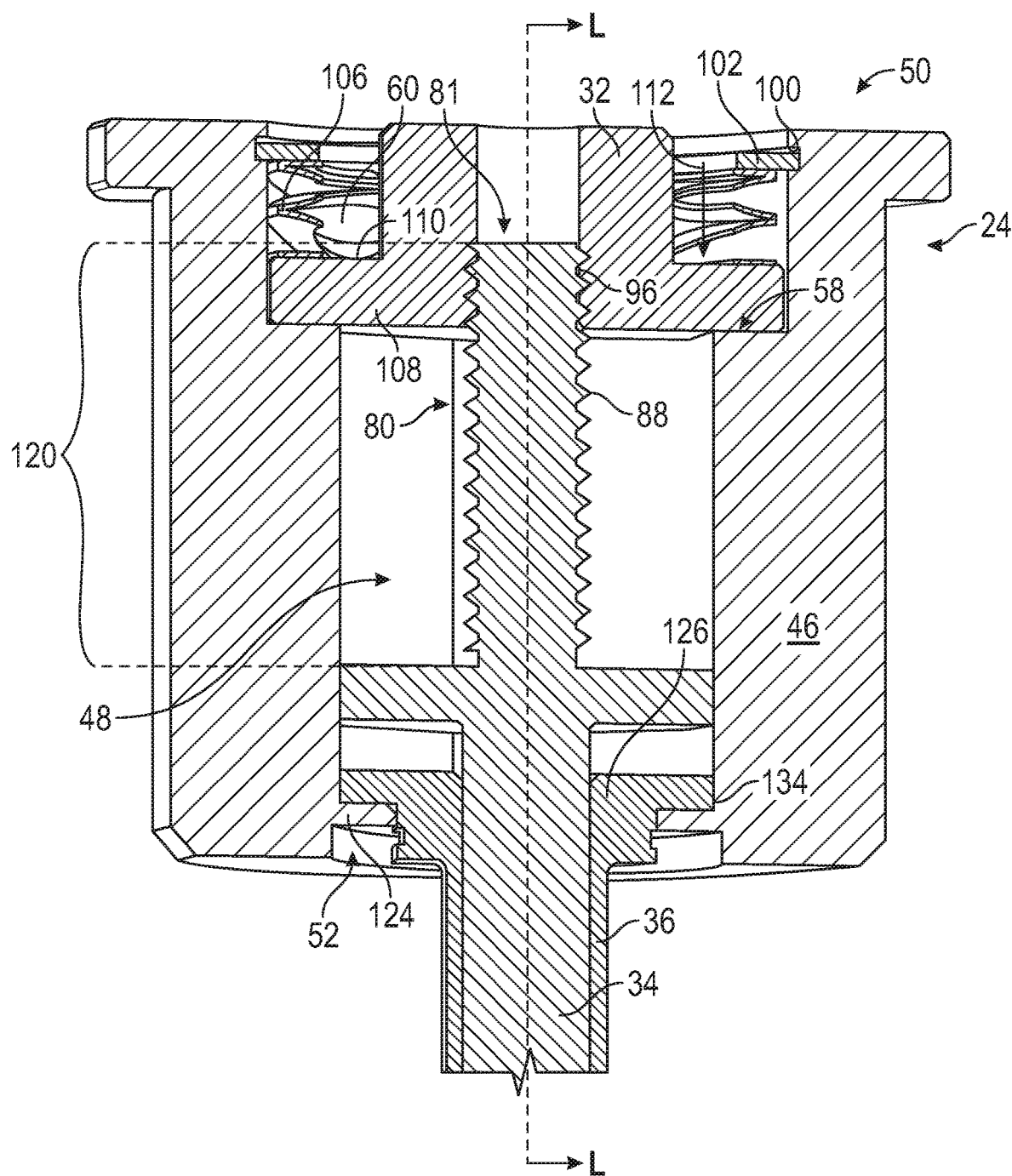
FIG. 5 is a cross-sectioned view of the bushing, the nut, pull shaft, and the guide member, according to an exemplary embodiment.

Continuing to refer to FIGS. 4 and 5, the pull shaft 34 further includes an upper end portion 81 and a lower end portion 82. The upper end portion 80 of the pull shaft 34 includes a threaded surface 88. The nut 32 defines a threaded aperture 96 that is threadingly engaged with the threaded surface 88 of the upper end portion 80 of the elongated body 70 of the pull shaft 34. It is to be appreciated that the nut 32 is rotatable relative to the bushing 24. The pull shaft 34 linearly translates relative to the bushing 24 as the nut 32 is rotated relative to the bushing 24, which is described below.

Referring to FIGS. 3 and 5, a slot 100 disposed around the annular surface 66 of the first opening 60 of the housing 46 of the bushing 24. The slot 100 is shaped to receive a circlip 102. Referring to FIGS. 1, 3, and 5, the circlip 102 is a retaining ring that is configured to retain a biasing element 106 within the inner cavity 48 of the bushing 24. In the embodiment as shown in the figures, the biasing element 106 is an annular wave spring, however, it is to be appreciated that other biasing elements may be used as well. The biasing element 106 is disposed within the first opening 60 of the bushing 24 and is seated against an upper surface 110 of a flange 108 that is part of the nut 32. Accordingly, the biasing element 106 is compressed between the circlip 102 and the flange 108 of the bushing 24. The biasing element 106 exerts a biasing force 112 upon the flange 108 of the nut 32 in a direction towards the step 58 of the housing 46 of the bushing 24. The biasing force 112 retains the nut 32 against the step 58 of the housing 46 of the bushing 24.

A portion 120 of the pull shaft 34 is disposed in the inner cavity 48 of the bushing 24. Specifically, the upper end portion 81 of the elongated body 70 of the pull shaft 34, which includes the threaded surface 88, is disposed along an axis of translation L-L of the temporary clamping fastener 10. The threaded aperture 96 of the nut 32 is threadingly engaged with the threaded surface 88 of the upper end portion 80 of the elongated body 70 of the pull shaft 34. The nut 32 is positioned in the upper open end 50 of the bushing 24, where the nut 32 is rotatable relative to the bushing 24. The pull shaft 34 is configured to linearly translate relative to the bushing 24. Specifically, as the nut 32 is rotated relative to the bushing 24 and around the threaded surface 88 of the pull shaft 34, the pull shaft 34 linearly translates along the axis of translation L-L relative to the bushing 24.

For example, in one example as the nut 32 is rotated relative to the bushing 24 in a clockwise direction, the pull shaft 34 is translated in a direction towards the upper open end 50 of the bushing 24. Similarly, rotating the nut 32 relative to the bushing 24 in a counterclockwise direction, the pull shaft 34 is translated in a direction away from the upper open end 50 and towards the lower open end 52 of the bushing 24. As explained below, the clamp blade 40 (FIG. 2) rotates from the stowed position into the deployed position (FIG. 1) as the pull shaft 34 translates in the direction towards the upper open end 50 of the bushing 24. Similarly, the clamp blade 40 also rotates from the deployed position into the stowed position as the pull shaft 34 translates towards the closed open end 52 of the bushing 24.

Figure 6:
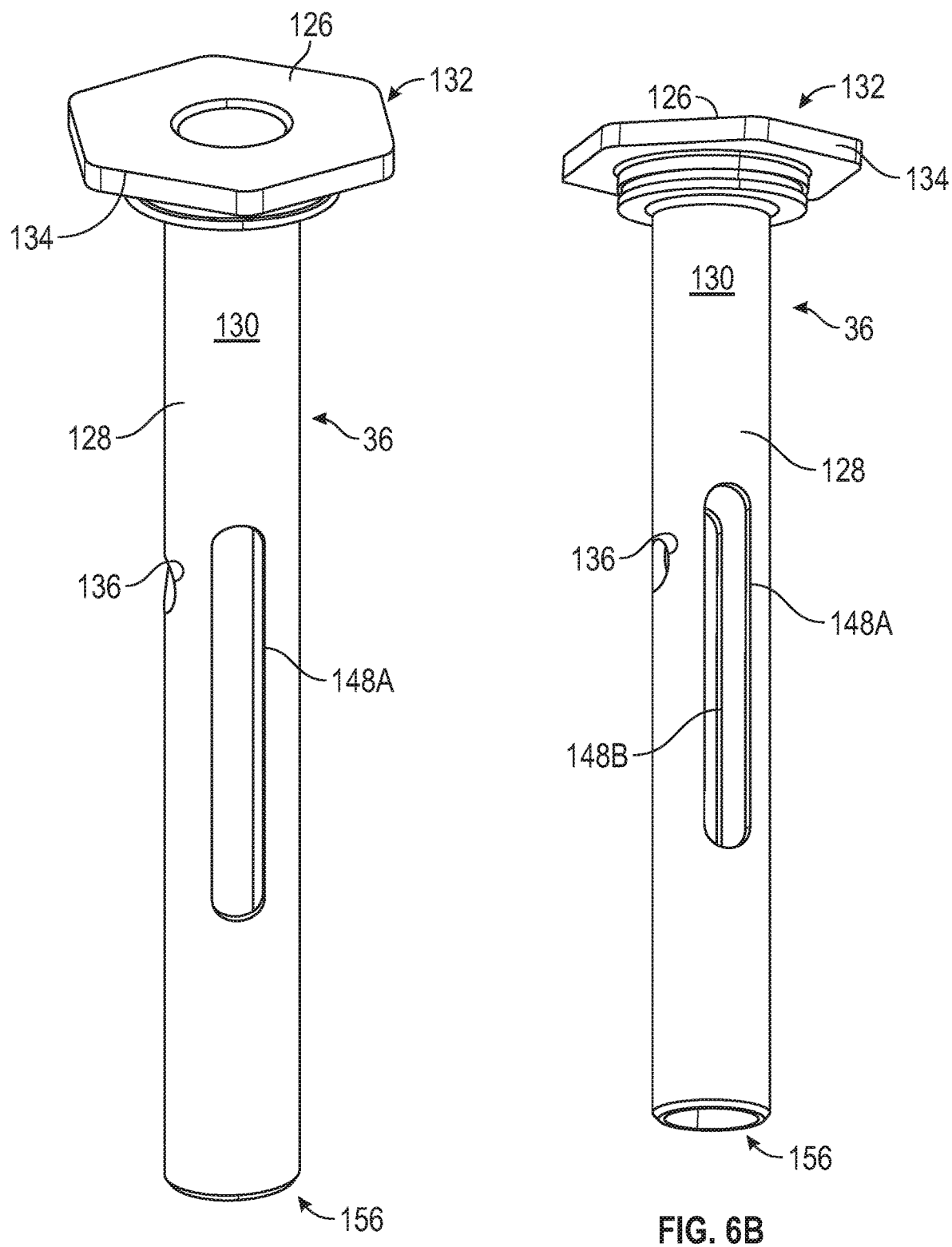
FIG. 6A is a perspective view of the guide member, according to an exemplary embodiment.
FIG. 6B is another perspective view of the guide member, according to an exemplary embodiment.
Figure 7:
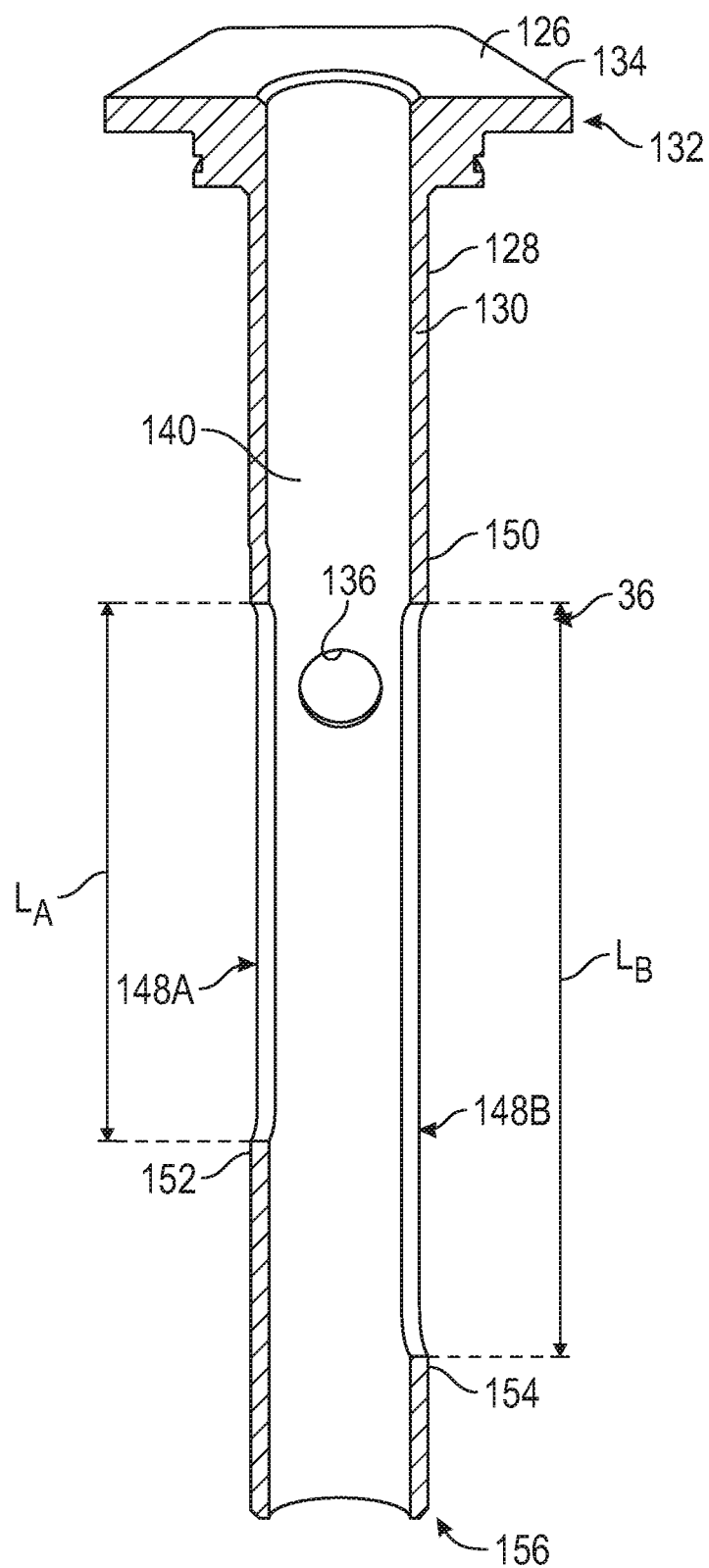
FIG. 7 is a cross-sectioned view of the guide member, according to an exemplary embodiment.

A shelf 124 is located at the closed open end 52 of the bushing 24 and is disposed around the keyed surface 68 inside the second opening 62 of the inner cavity 48. Referring to FIGS. 6A, 6B, and 7, the guide member 36 includes a boss 126 that projects radially outward from an outer surface 128 of an annular wall 130 of the guide member 36. The boss 126 of the guide member 36 is located at an uppermost end 132 of the guide member 36. Referring to FIGS. 5, 6A, 6B, and 7, the boss 126 of the guide member 36 is seated against the shelf 124 of the bushing 24. The boss 126 of the guide member 36 defines a radial surface 134 that is complimentary to the keyed surface 68 of the inner cavity 48 of the bushing 24. Accordingly, the radial surface 76 of the boss 74 engages with the keyed surface 68 of the inner cavity 48 of the bushing 24. The engagement between the radial surface 134 of the boss 126 with the keyed surface 68 of the inner cavity 48 of the bushing 24 prevents relative rotation between the guide member 36 and the bushing 24.

FIGS. 6A and 6B are perspective views of the guide member 36, and FIG. 7 is a cross-sectioned view of the guide member 36. The guide member 36 defines a passageway 140, where the pull shaft 34 (FIGS. 4 and 5) linearly translates within the passageway 140 of the guide member 36. The passageway 140 of the guide member 36 includes the annular wall 130 that is shaped to correspond with an outermost surface 146 of the elongated body 70 of the pull shaft 34 (FIG. 4).

The guide member 36 includes a pair of apertures 136 that oppose one another and extend through the annular wall 130 of the guide member 36, where the apertures 136 are shaped to receive the dowel pin 38 (FIG. 1). The guide member 36 further includes a pair of slits 148A, 148B that oppose one another, and extend through the annular wall 130 of the guide member 36. Referring specifically to FIG. 7, the pair of slits 148A, 148B each include a respective length $L_A$ and $L_B$, where the respective lengths $L_A$ and $L_B$ extend in a direction parallel to the axis of translation L-L (FIG. 5). A length $L_A$ of a first slit 148A is less than a length $L_B$ of a second slit 148B. Specifically, both slits 148A, 148B start at the same upper location 150 along the outer surface 128 of the annular wall 130. The first slit 148A extends at a first lower location 152 along the outer surface 128 of the guide member 36. The second slit 148B extends at a second lower location 154 along the outer surface 128 of the guide member 36, where the second lower location 154 is closer to a lowermost end 156 of the guide member 36 when compared to the first lower location 152.

Figure 2:
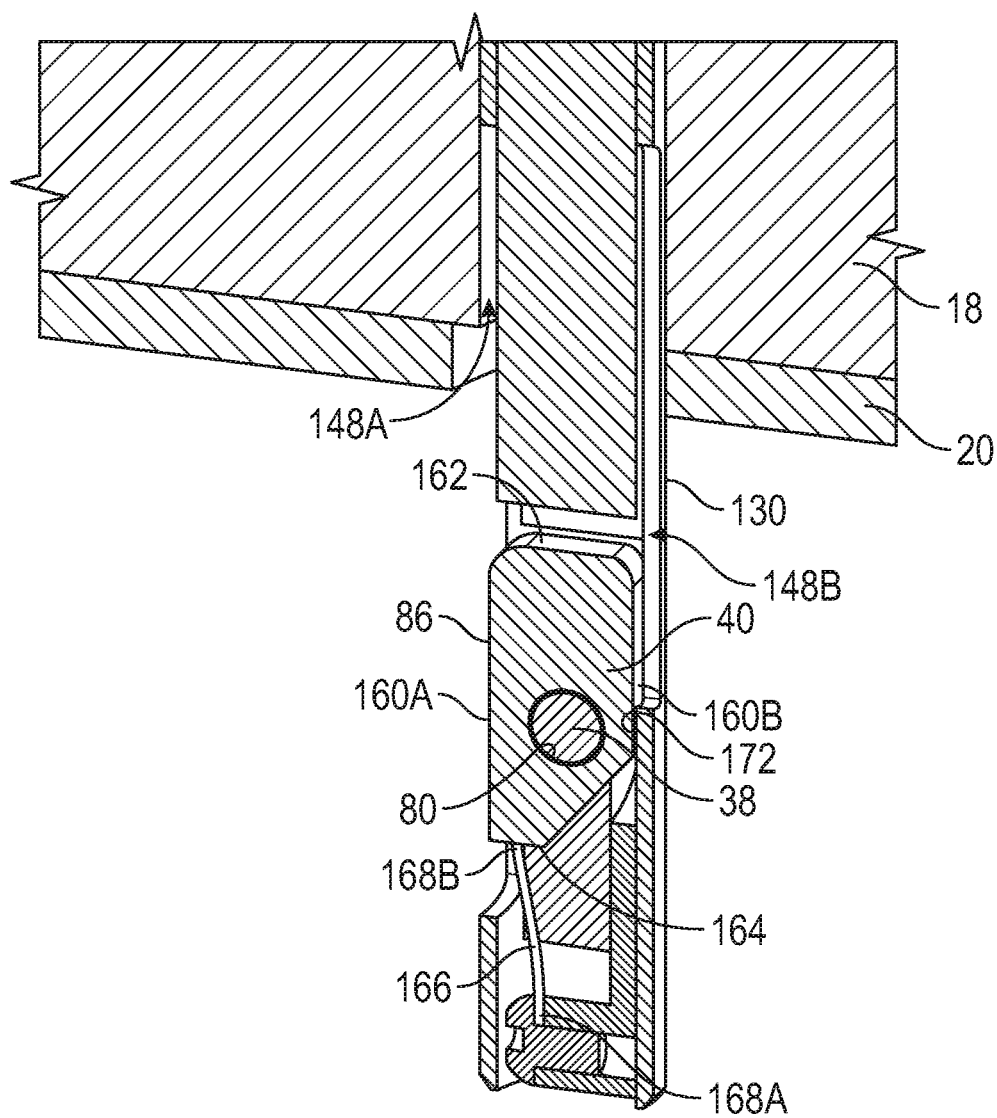
FIG. 2 illustrates the clamp blade in a stowed position, according to an exemplary embodiment.
Figure 8:
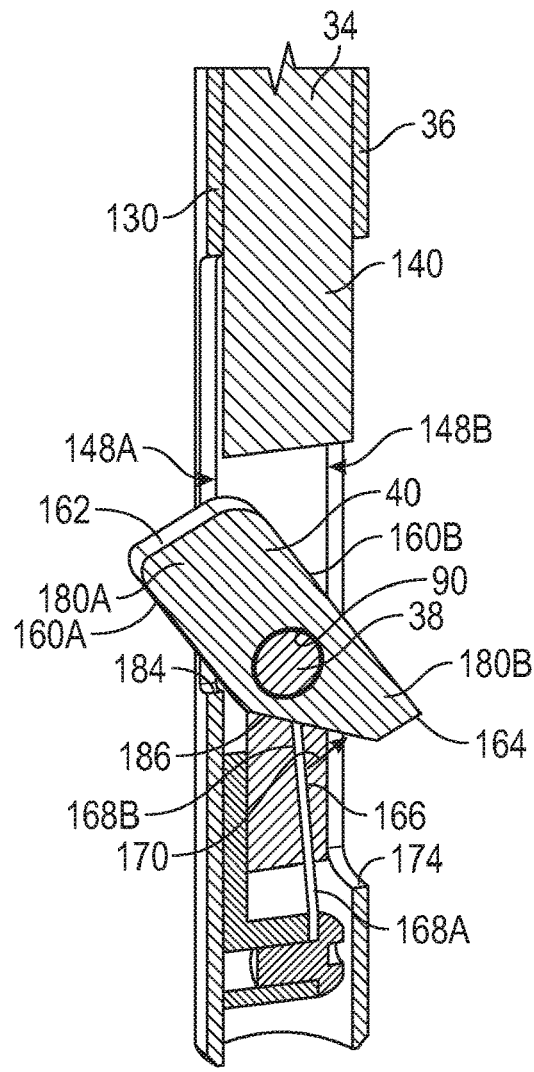
FIG. 8 is a cross-sectioned view of the clamp blade, the pull shaft, and the guide member, where the clamp blade is in a transition position, according to an exemplary embodiment.

FIG. 8 is an enlarged view of the pull shaft 34, the guide member 36, and the clamp blade 40. The clamp blade 40 is disposed within the passageway 140 of the guide member 36. The clamp blade 40 is oriented in a transition position where the clamp blade 40 is rotating about the dowel pin 38 from the stowed position (FIG. 2) into the deployed position (FIG. 1). Referring to FIGS. 2 and 8, when in the stowed position the clamp blade 40 is aligned with the axis of translation L-L of the clamp blade 40 (FIG. 5), and the clamp blade 40 is housed entirely includes the passageway 140 of the guide member 36.

The annular wall 130 of the guide member 36 abuts against the clamp blade 40 to retain the clamp blade 40 in the stowed position. Specifically, the clamp blade 40 includes opposing sides 160A and 160B, an upper side 162, and a lower side 164. Specifically, a first side 160A is the engagement surface 86 of the clamp blade 40, and a second side 160B contacts the annular wall 130 of the guide member 36 when in the stowed position (seen in FIG. 2). The second side 160B of the clamp blade 40 abuts against a portion 172 of the annular wall 130 of the guide member 36, where the portion 172 of the annular wall 130 is located directly adjacent to the second slit 148B.

Referring to FIGS. 2, 5, and 8, the clamp blade 40 is urged out of the stowed position as the pull shaft 34 translates within the passageway 140 of the guide member 36 in the direction towards the upper open end 50 of the bushing 24. Specifically, the clamp blade 40 is urged out of the stowed position by a biasing element 166 that is disposed within the passageway 140 of the guide member 36. In the exemplary embodiment as shown, the biasing element 166 is a flat spring that is constructed of a flat strip of material such as, for example, spring steel. The biasing element 166 includes opposing ends 168A, 168B, where a first end 168A if the biasing element 166 is retained in place and a second end 168B is unrestrained. The second end 168B of the biasing element 166 contacts the lower side 164 of the clamp blade 40, and thereby exerts a biasing force 170 (FIG. 8) upon the clamp blade 40. As explained below, the biasing force 170 urges the clamp blade 40 about the dowel pin 38 into the deployed position seen in FIG. 1.

Referring specifically to FIGS. 5 and 8, as the pull shaft 34 is translated upwardly and towards the bushing 24 (seen in FIG. 5), the second side 160B of the clamp blade 40 slides off a side edge 174 of the second slit 148B in the annular wall 130 of the guide member 36. The movement of the clamp blade 40 is caused by the biasing force 170 exerted by the biasing element 166. Specifically, the biasing force 170 causes the second side 160B of the clamp blade 40 to slide off the side edge 174 of the annular wall 130 of the guide member 36, and into the transition position seen in FIG. 8.

Referring specifically to FIG. 8, two separate portions 180A, 180B of the clamp blade 40 each extend from a corresponding one of the pair of slits 148A, 148B in the passageway 140 of the guide member 36 as the pull shaft 34 is translated in the direction towards the upper open end 50 of the bushing 24 (FIG. 5). Specifically, a first portion 180A of the clamp blade 40 includes the first side 160A of the clamp blade 40 and a second portion 180B of the clamp blade 40 includes the second side 160B of the clamp blade 40. The biasing force 170 urges the clamp blade 40 into the deployed position (seen in FIG. 1) as the pull shaft 34 is translated in the direction towards the upper open end 50 of the bushing 24 (FIG. 5). Specifically, FIG. 8 illustrates the second end 168B of the biasing element 166 exerting the biasing force 170 against an angled or ramped side 186 of the clamp blade 40, where the ramped side 186 connects the first side 160A of the clamp blade 40 to the lower side 164 of the clamp blade 40. The biasing element 166 continues to exert the biasing force 170 until the second end 168B of the biasing element 166 no longer contacts the ramped side 186 of the clamp blade 40. A side edge 184 of the first slit 148A then contacts the first side 160A of the clamp blade 40.

Figure 9:
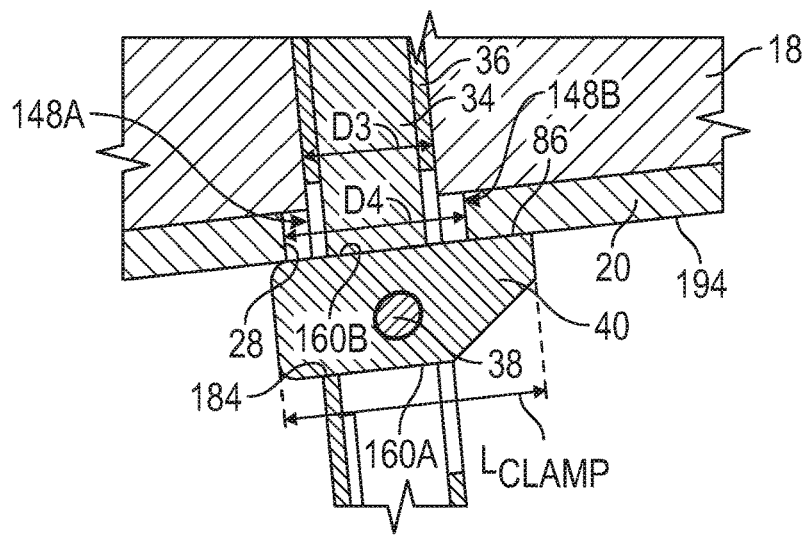
FIG. 9 is a cross-sectioned view of the clamp blade shown in FIG. 8, where the clamp blade is now in the deployed position, according to an exemplary embodiment.

FIG. 9 is an enlarged view of the clamp blade 40 shown in FIG. 8, where the clamp blade 40 is in the deployed position. The side edge 184 of the first slit 148A of the annular wall 130 of the guide member 36 abuts against the first side 160A of the clamp blade 40, where the abutment secures the clamp blade 40 in place in the deployed position. The engagement surface 86 of the clamp blade 40 abuts against a lowermost surface 194 of the metal layer 20. The engagement surface 86 of the clamp blade 40 includes a length $L_{CLAMP}$. The drilled aperture 28 of the carbon fiber layer 18 includes an aperture diameter D3, and the backside pilot aperture 28 includes a backside pilot diameter D4, where the backside pilot diameter D4 is greater than the aperture diameter D3. However, the length $L_{CLAMP}$ of the engagement surface 86 of the clamp blade 40 is greater than the backside pilot diameter D4. Accordingly, the disclosed temporary clamping fastener 10 may be used to secure any through-hole that has a backside pilot hole with a diameter that is less than the length $L_{CLAMP}$ of the clamp blade 40. In contrast, conventional clamping fasteners usually have limited radial expansion and may only be able to accommodate through-holes with a smaller backside pilot hole.

Figure 10:
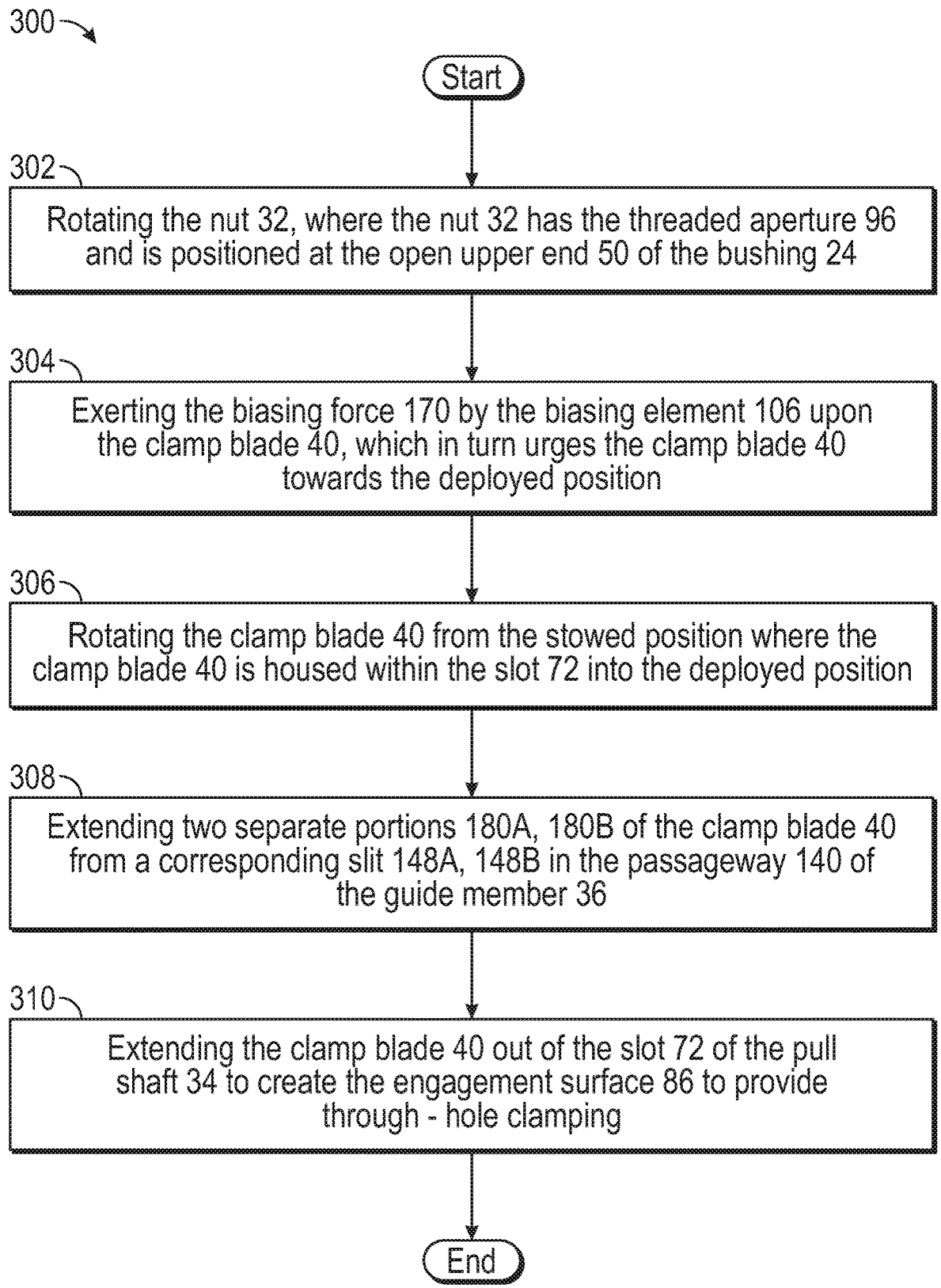
FIG. 10 is a process flow diagram illustrating a method of installing the temporary clamping fastener to a through-hole of a multi-layer assembly, according to an exemplary embodiment.

FIG. 10 is an exemplary process flow diagram illustrating a method 300 of installing the temporary clamping fastener 10 to the through-hole 30 that is part of the multi-layer assembly 12. Referring generally to FIGS. 1, 3, 5, and 10, the method 300 begins at block 302. In block 302, the nut 32 is rotated. The nut 32 has the threaded aperture 96 that is positioned at the upper open end 50 of the bushing 24, and the bushing 24 is disposed within the primary pilot hole 22 of the multi-layer assembly 12 (seen in FIG. 1). The method 300 may then proceed to block 304.

In block 304, the biasing element 106 (seen in FIGS. 2 and 8) exerting the biasing force 170 upon the clamp blade 40, which in turn urges the clamp blade 40 towards the deployed position as the pull shaft 34 is translated in a linear direction towards the upper open end 50 of the bushing 24 by the biasing force 170 exerted by the biasing element 106. The method 300 may then proceed to block 306.

In block 306, the clamp blade 40, which is disposed within the slot 72 of the pull shaft 34, is rotated from the stowed position where the clamp blade 40 is housed within the slot 72 (see FIG. 2) into the deployed position (see FIGS. 1 and 9), where the clamp blade 40 is rotated to the deployed position as the pull shaft 34 translates in the direction towards the upper open end 50 of the bushing 24. The method 300 then proceeds to block 308.

In block 308, two separate portions 180A, 180B (FIG. 8) of the clamp blade 40 are extended from a corresponding slit 148A, 148B in the passageway 140 of the guide member 36 as the pull shaft 34 is translated in the direction towards the upper open end 50 of the bushing 24. The pull shaft 34 linearly translates within the passageway 140 of the guide member 36 and the passageway 140 of the guide member 36 includes the annular wall 130 having the pair of slits 148A, 148B that oppose one another. The method 300 may then proceed to block 310.

In block 310, the clamp blade 40 extends out of the slot 72 of the pull shaft 34 to create the engagement surface 86 for providing through-hole clamping of the multi-layer assembly 12. After rotating the clamp blade 40 into a deployed position for extending a portion of the clamp blade 40 out of the slot 72 to create an engagement surface 86, the method includes the step of further translating the pull shaft 34 upward (by rotation of nut 32) to cause the engagement surface to contact a lower side of an assembly or workpiece to provide through-hole clamping of the assembly. The method may further comprise the step of further translating the pull shaft 34 downward (by opposite rotation of nut 32) to disengage through-hole clamping and cause the clamp blade 40 to rotate into a stowed position such that the temporary clamping fastener may be removed from the assembly.

Referring generally to the figures, the disclosed temporary clamping assembly provides various technical effects and benefits. Specifically, the clamp blade is extendable into the deployed position to define an engagement surface during the clamping process. The length of the engagement surface of the clamp blade dictates the limit on the diameter of the backside pilot hole. The disclosed clamping fastener does not have the same limits as conventional clamping fasteners, which typically have limited radial expansion and may only be able to accommodate through-holes with a smaller backside pilot hole. Additionally, unlike some conventional clamping fasteners, the disclosed temporary clamping fastener does not require a backup load bearing washer installed around the backside pilot hole. As a result, only one operator is required to install the temporary clamping fastener to an assembly.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A temporary clamping fastener, comprising:
a bushing having an inner cavity, an upper open end, and a lower open end;
a nut positioned in the upper open end of the bushing, wherein the nut is rotatable relative to the bushing;
a pull shaft having an elongated body and a slot extending through the elongated body, wherein a portion of the pull shaft is disposed in the inner cavity of the bushing, and the pull shaft is configured to linearly translate relative to the bushing; and
a clamp blade disposed within the slot of the pull shaft and rotatable between a stowed position where the clamp blade is housed within the slot and aligned with an axis of the temporary clamping fastener and a deployed position where a portion of the clamp blade extends from the slot of the pull shaft to create an engagement surface for through-hole clamping, wherein the clamp blade rotates from the stowed position into the deployed position as the pull shaft translates in a direction towards the upper open end of the bushing.

2. The temporary clamping fastener of claim 1, wherein the nut defines a threaded aperture that is threadingly engaged with an upper end portion of the elongated body of the pull shaft.

3. The temporary clamping fastener of claim 2, wherein the pull shaft linearly translates relative to the bushing as the nut is rotated relative to the bushing.

4. The temporary clamping fastener of claim 1, further comprising a guide member defining a passageway, wherein the pull shaft linearly translates within the passageway of the guide member.

5. The temporary clamping fastener of claim 4, wherein the passageway of the guide member is defined by an annular wall, and wherein the annular wall of the guide member abuts against the clamp blade such that the clamp blade is retained in the stowed position by the annular wall of the guide member.

6. The temporary clamping fastener of claim 4, wherein the passageway of the guide member includes an annular wall having a pair of slits that oppose one another, and two separate portions of the clamp blade each extend from a corresponding one of the pair of slits in the passageway of the guide member as the pull shaft is translated in the direction towards the upper open end of the bushing.

7. The temporary clamping fastener of claim 6, wherein a side edge defined by one of the pair of slits in the annular wall of the guide member abuts against the clamp blade to retain the clamp blade in the deployed position.

8. The temporary clamping fastener of claim 1, further comprising a biasing element that exerts a biasing force upon the clamp blade, wherein the biasing force urges the clamp blade into the deployed position as the pull shaft is translated in the direction towards the upper open end of the bushing.

9. The temporary clamping fastener of claim 1, wherein the inner cavity of the bushing defines a keyed surface.

10. The temporary clamping fastener of claim 9, wherein the pull shaft includes a boss that projects radially outward from the elongated body, and wherein the boss of the pull shaft defines a radial surface that is complimentary to the keyed surface of the inner cavity of the bushing.

11. The temporary clamping fastener of claim 10, wherein the radial surface of the boss engages with the keyed surface of the inner cavity of the bushing to prevent relative rotation between the pull shaft and the bushing.

12. A temporary clamping fastener, comprising:
a bushing defining an inner cavity, an upper open end, and a lower open end;
a nut positioned in the upper open end of the bushing and rotatable relative to the bushing, wherein the nut defines a threaded aperture;
a pull shaft defining an elongated body, an upper end portion, and a slot extending through the elongated body of the pull shaft, wherein the upper end portion of the pull shaft is threadingly engaged with the threaded aperture of the nut, and wherein a portion of the pull shaft is disposed with the inner cavity of the bushing and is configured to linearly translate relative to the bushing as the nut is rotated relative to the bushing; and
a clamp blade disposed within the slot of the pull shaft and rotatable between a stowed position wherein the clamp blade is housed within the slot and aligned with an axis of the temporary clamping fastener, and a deployed position and a portion of the clamp blade extends out of the slot of the pull shaft to create an engagement surface for through-hole clamping, wherein the clamp blade rotates from the stowed position into the deployed position as the pull shaft translates in a direction towards the upper open end of the bushing.

13. The temporary clamping fastener of claim 12, further comprising a guide member defining a passageway, wherein the pull shaft linearly translates within the passageway of the guide member.

14. The temporary clamping fastener of claim 13, wherein the passageway of the guide member is defined by an annular wall, and wherein the annular wall of the guide member abuts against the clamp blade such that the clamp blade is retained in the stowed position by the annular wall of the guide member.

15. The temporary clamping fastener of claim 14, wherein the passageway of the guide member includes an annular wall having a pair of slits that oppose one another, and two separate portions of the clamp blade each extend from a corresponding one of the pair of slits in the passageway of the guide member as the pull shaft is translated in the direction towards the upper open end of the bushing.

16. The temporary clamping fastener of claim 12, further comprising a biasing element that exerts a biasing force upon the clamp blade, wherein the biasing force urges the clamp blade into the deployed position as the pull shaft is translated in the direction towards the upper open end of the bushing.

17. A method of installing a temporary clamping fastener to a through-hole that is part of a multi-layer assembly, the method comprising:
rotating a nut having a threaded aperture that is positioned at an upper open end of a bushing, wherein the bushing is disposed within a primary pilot hole of the multi-layer assembly;
translating a pull shaft in a linear direction towards the upper open end of the bushing, wherein an upper end portion of an elongated body of the pull shaft is engaged with the threaded aperture of the nut, and rotating the nut causes the pull shaft to translate in the linear direction;
rotating a clamp blade disposed within a slot of the pull shaft from a stowed position wherein the clamp blade is housed within the slot and aligned with an axis of the temporary clamping fastener, into a deployed position, and the clamp blade is rotated to the deployed position as the pull shaft translates in a direction towards the upper open end of the bushing;

exerting a biasing force upon the clamp blade by a biasing element;

urging the clamp blade towards the deployed position as the pull shaft is translated in the direction towards the upper open end of the bushing by the biasing force exerted by the biasing element; and extending the clamp blade out of the slot of the pull shaft to create an engagement surface for providing through-hole clamping of the multi-layer assembly.

18. The method of claim 17, further comprising:

extending two separate portions of the clamp blade from a corresponding slit in a passageway of a guide member as the pull shaft is translated in the direction towards the upper open end of the bushing, wherein the pull shaft linearly translates within a passageway of the guide member; and translating the pull shaft in the linear direction towards the open end of the bushing, with the portions of the clamp blade extending out of the slits in the guide member, to create an engagement surface for providing through-hole clamping of an assembly.

19. A temporary clamping fastener, comprising:

a bushing having an inner cavity, an upper open end, and a lower open end, wherein the inner cavity of the bushing defines a keyed surface;

a pull shaft having an elongated body and a slot extending through the elongated body, wherein a portion of the pull shaft is disposed in the inner cavity of the bushing, and the pull shaft is configured to linearly translate relative to the bushing; and a clamp blade disposed within the slot of the pull shaft and rotatable between a stowed position where the clamp blade is housed within the slot and aligned with an axis of the temporary clamping fastener and a deployed position where a portion of the clamp blade extends from the slot of the pull shaft to create an engagement surface for through-hole clamping, wherein the clamp blade rotates from the stowed position into the deployed position as the pull shaft translates in a direction towards the upper open end of the bushing.

20. The temporary clamping fastener of claim 19, wherein the pull shaft includes a boss that projects radially outward from the elongated body, and wherein the boss of the pull shaft defines a radial surface that is complimentary to the keyed surface of the inner cavity of the bushing.

* * * * *